（12) United States Patent
Mukai

(10) Patent No.: US 10,759,607 B2
(45) Date of Patent: Sep. 1, 2020

(54) LINEAR CONVEYOR AND RELAY UNIT

(71) Applicant: YAMAHA HATSUDOKI KABUSHIKI KAISHA, Iwata-shi, Shizuoka-ken (JP)

(72) Inventor: Masayuki Mukai, Shizuoka (JP)

(73) Assignee: YAMAHA HATSUDOKI KABUSHIKI KAISHA, Iwata-shi, Shizuoka-ken (JP)

( * ) Notice: Subject to any disclaimer, the term of this patent is extended or adjusted under 35 U.S.C. 154(b) by 0 days.

(21) Appl. No.: 16/330,036

(22) PCT Filed: Sep. 23, 2016

(86) PCT No.: PCT/JP2016/077946
§ 371 (c)(1),
(2) Date: Mar. 1, 2019

(87) PCT Pub. No.: WO2018/055720
PCT Pub. Date: Mar. 29, 2018

(65) Prior Publication Data
US 2019/0202639 A1    Jul. 4, 2019

(51) Int. Cl.
*B65G 25/04* (2006.01)
*H02K 41/02* (2006.01)
*B65G 54/02* (2006.01)

(52) U.S. Cl.
CPC ............. *B65G 25/04* (2013.01); *B65G 54/02* (2013.01); *H02K 41/02* (2013.01); *B65G 2812/12* (2013.01)

(58) Field of Classification Search
CPC .... B65G 25/04; B65G 54/02; B65G 2812/12; H02K 41/02

(Continued)

(56) References Cited

U.S. PATENT DOCUMENTS

| 5,530,303 A | 6/1996 | Takei |
| 2014/0331888 A1* | 11/2014 | Wernersbach ........ B60L 13/006 104/282 |

(Continued)

FOREIGN PATENT DOCUMENTS

| DE | 102014117150 A1 * | 5/2016 | ........... B65G 47/962 |
| JP | H05-236731 A | 9/1993 | |

(Continued)

OTHER PUBLICATIONS

International Search Report issued in PCT/JP2016/077946; dated Dec. 6, 2016.

*Primary Examiner* — Mark A Deuble
(74) *Attorney, Agent, or Firm* — Studebaker & Brackett PC

(57) ABSTRACT

A linear conveyor includes a plurality of modules constituting a conveyance path and a slider that travels along the conveyance path. The linear conveyor includes at least one relay unit disposed across adjacent modules. The modules are configured such that each of the modules has first and second module-side connection sections provided at both ends in a direction along the conveyance path, the modules being connected in a row along the conveyance path. The relay unit includes a first unit-side connection section that is connected to the second module-side connection section of one of a set of the adjacent modules, a second unit-side connection section that is connected to the first module-side connection section of the other of the set of the adjacent modules, and a first circuit that electrically connects the first and second unit-side connection sections to each other.

13 Claims, 14 Drawing Sheets

(58) Field of Classification Search
USPC .......................................................... 198/619
See application file for complete search history.

(56) References Cited

U.S. PATENT DOCUMENTS

| | | | | |
|---|---|---|---|---|
| 2015/0008768 A1* | 1/2015 | Achterberg | ............ | H02K 41/03 |
| | | | | 310/12.11 |
| 2015/0303841 A1* | 10/2015 | Suzuki | .................... | H02P 6/006 |
| | | | | 318/38 |
| 2015/0349618 A1* | 12/2015 | Kleinikkink | ............ | H02K 1/165 |
| | | | | 310/12.19 |
| 2020/0010287 A1* | 1/2020 | Urata | .................... | B65G 54/02 |
| 2020/0048016 A1* | 2/2020 | Sinzenich | ............. | B65G 23/24 |

FOREIGN PATENT DOCUMENTS

| | | |
|---|---|---|
| JP | H07-011890 U | 2/1995 |
| JP | 2004-023954 A | 1/2004 |
| JP | 2011-205841 A | 10/2011 |
| JP | 5753060 B2 | 7/2015 |

\* cited by examiner

FIG.3
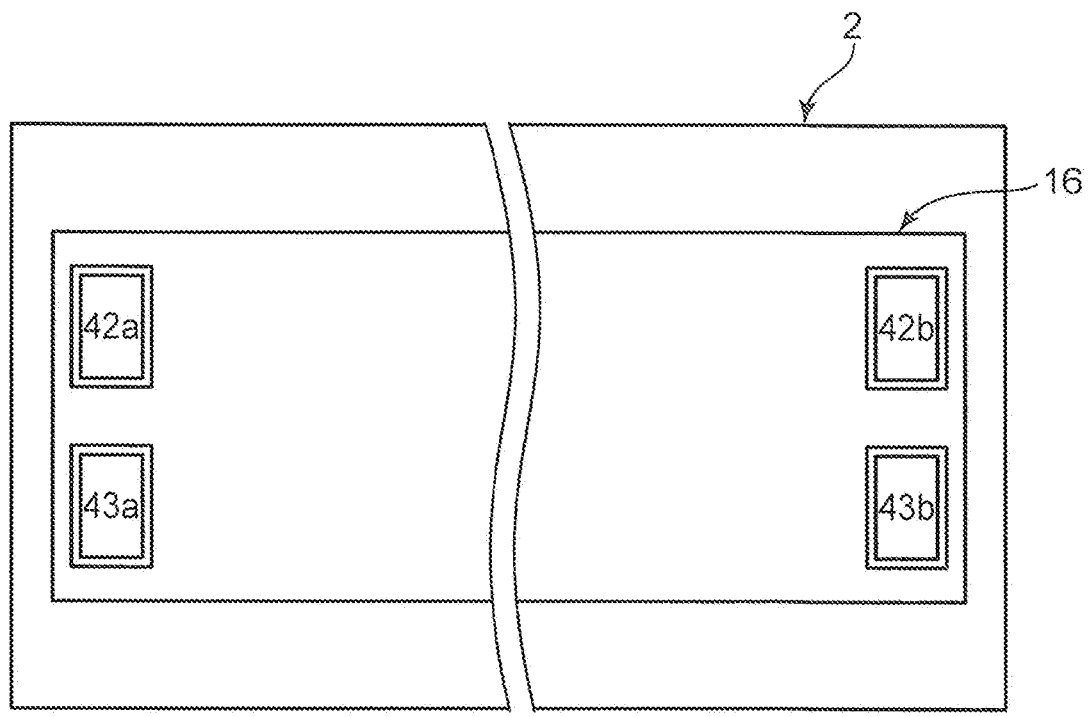
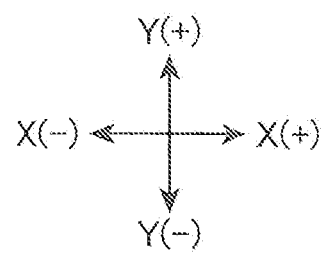

FIG.4
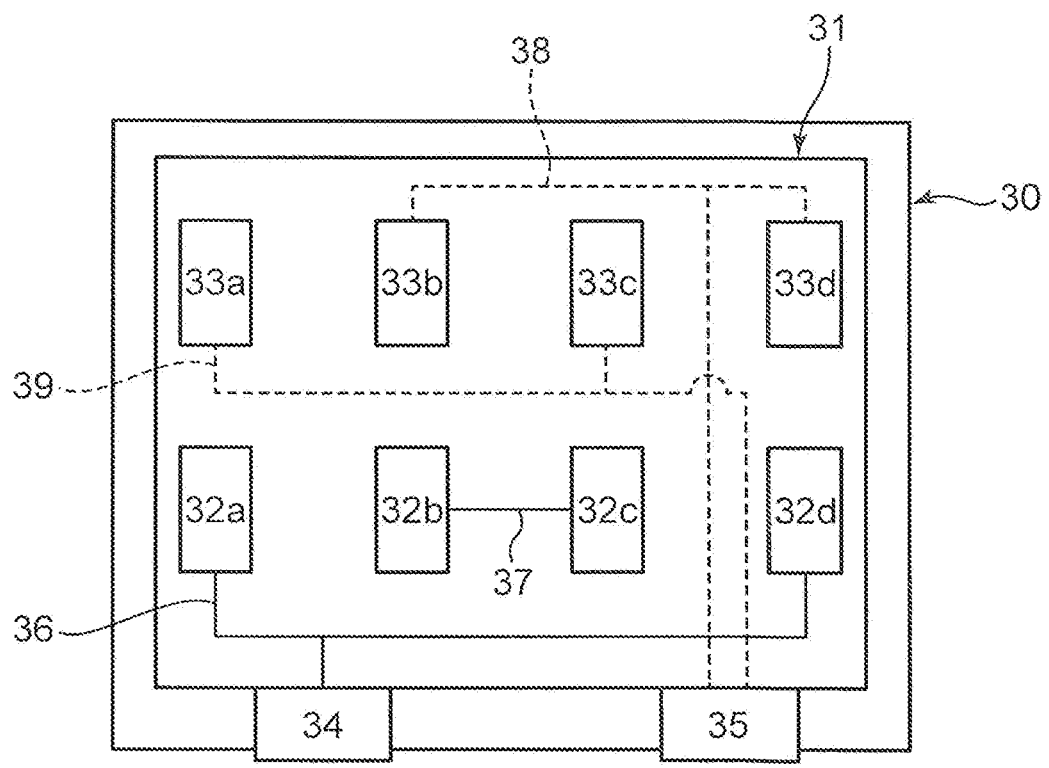
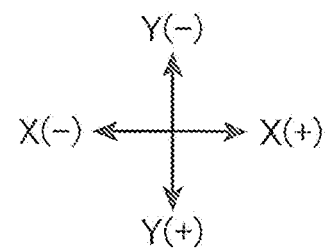

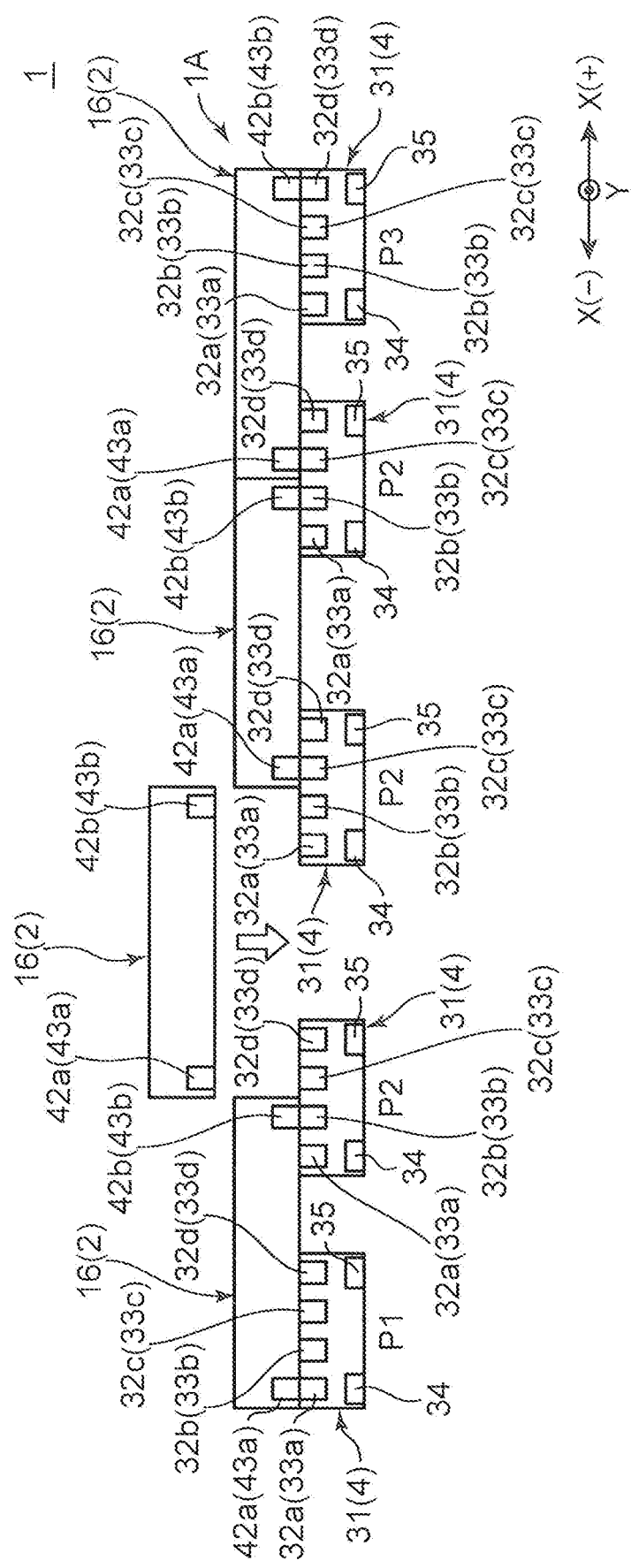

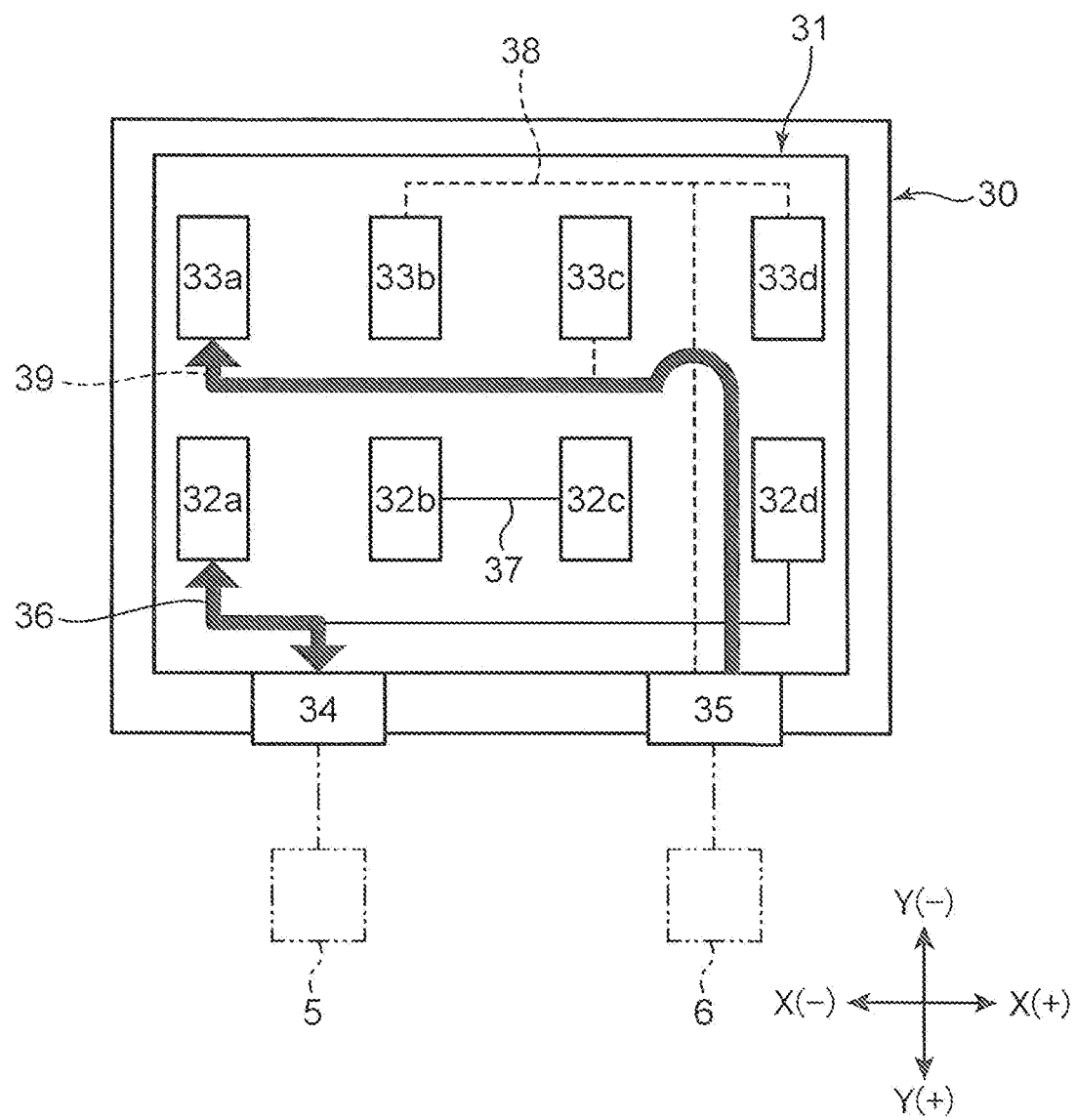

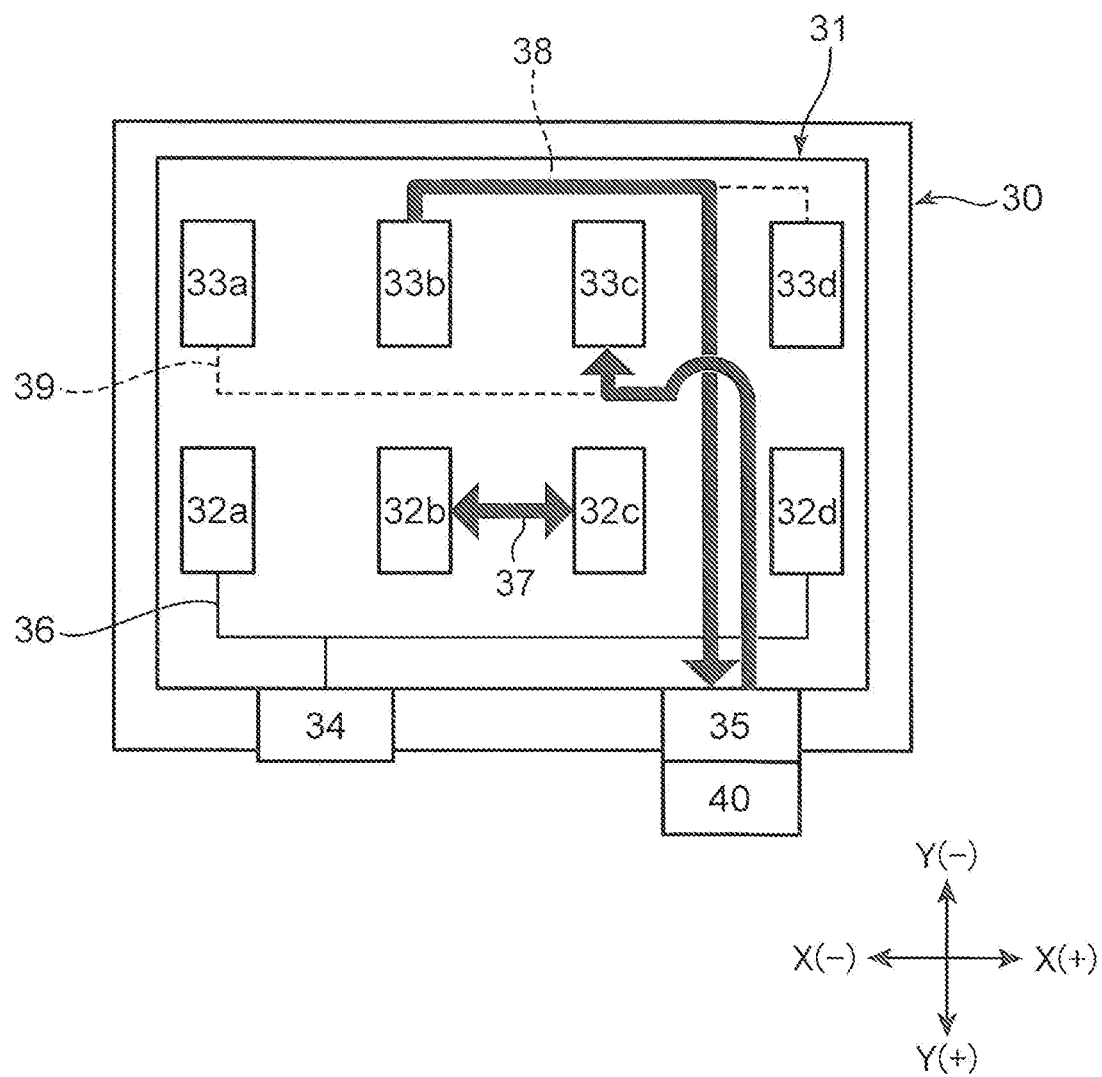

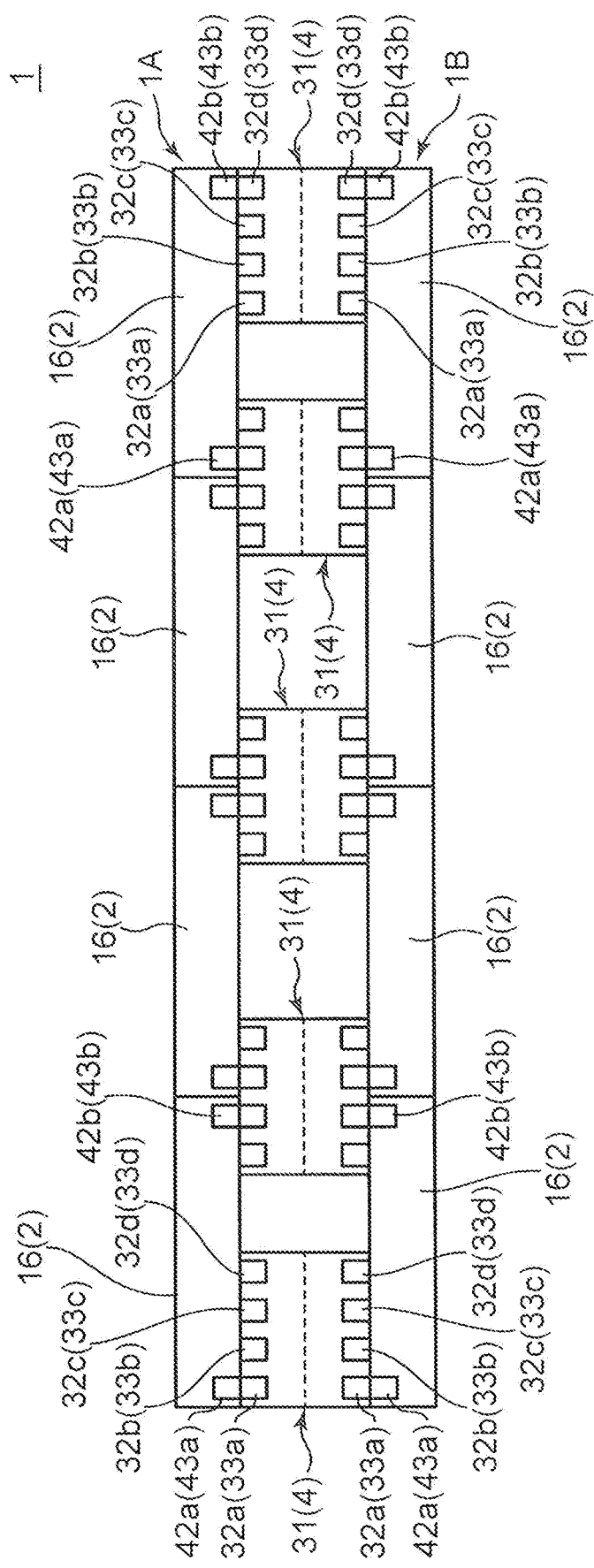

LINEAR CONVEYOR AND RELAY UNIT

CROSS-REFERENCE TO RELATED APPLICATION

This application is a National Stage of International Patent Application No. PCT/JP2016/077946, filed Sep. 23, 2016, the entire content of which is incorporated herein by reference.

BACKGROUND

Technical Field

The present disclosure relates to a linear conveyor in which a linear motor is used as a drive source, and particularly relates to the linear conveyor adopting a module structure.

Background Art

A linear conveyor in which a linear motor is used as a drive source is publicly known. Further, as the linear conveyor, a linear conveyor adopting a module structure is proposed in order to realize forms based on applications (a path length or the like) more easily while commonality of components is being improved.

For example, Japanese Patent No. 5753060 proposes a linear conveyor in which a plurality of modules are connected to each other to constitute a conveyance path, and a slider travels along the conveyance path. Each of the modules includes a rail, a linear motor stator (an electromagnet), and a scale section of a linear scale. The slider includes a linear motor mover (a permanent magnet), and a head (a detector) of the liner scale.

In this linear conveyor, the length of the conveyance path can be freely selected based on a number of the modules to be connected, and a number of the sliders to travel can be freely selected based on applications. For this reason, the linear conveyor that agree with a form required by a user can be easily provided while commonality of components is being improved.

Note that in the linear conveyor, a wire connector is provided to each of the modules and controllers are connected to the plurality of modules via the wire connectors, respectively. The controllers are connected to a local area network (LAN) to communicate with each other, and simultaneously cause the linear motor stator to be energized, namely, controls traveling and a stop position of the slider in each of the modules. For this reason, at the time of assembling the linear conveyor, the plurality of modules are mechanically connected, the controllers are connected to the modules by electric wires, respectively, and the controllers are connected to the LAN. Further, although not described in Japanese Patent No. 5753060, power sources are prepared for the plurality of modules, respectively, and the power sources and the controllers have to be connected to each other by electric wires, respectively. That is, in the linear conveyor in Japanese Patent No. 5753060, a comparatively great number of wires are provided for communication and power supply, and a space used by the linear conveyor including a wire area tends to be wide. Further, wiring work at the time of assembling the linear conveyor requires comparatively great care.

SUMMARY

The present disclosure provides a technique that can reduce wiring for communication and power supply in a linear conveyor adopting a module structure.

The present disclosure is a linear conveyor including a plurality of modules that has rails and linear motor stators, respectively, and is connected to each other in a row to constitute a conveyance path, a slider that includes a linear motor mover and travels along the conveyance path, and at least one relay unit that is disposed across a set of modules adjacent to each other in a connecting position of the set of modules. The plurality of modules are configured such that each of the plurality of modules has first and second module-side connection sections provided on identical surfaces at both ends in a direction along the conveyance path, the plurality of modules being connected in a row in a state that the first module-side connection sections are located on one side in the direction along the conveyance path. The relay unit includes a first unit-side connection section that is provided in a position opposite to the second module-side connection section in one of the set of modules and is electrically and directly connected to the second module-side connection section, a second unit-side connection section that is provided in a position opposite to the first module-side connection section in the other of the set of modules and is electrically and directly connected to the first module-side connection section, and a first circuit unit that electrically connects the first and second unit-side connection sections to each other.

BRIEF DESCRIPTION OF THE DRAWINGS

FIG. 3 is a lower surface schematic diagram illustrating a module controller.

FIG. 4 is a planer schematic diagram of a relay unit;

FIG. 5 is a schematic diagram viewed from a side of the linear conveyor for describing a positional relationship between a module controller-side connector and a relay unit-side connector;

FIG. 6A is a planar schematic diagram illustrating an energized state of the relay unit disposed on a first end position;

FIG. 6B is a planar schematic diagram illustrating an energized state of the relay unit disposed on a connecting position;

FIG. 12 is a plan view of the linear conveyor according to a modified example.

DETAILED DESCRIPTION

A preferred exemplary embodiment of the present disclosure will be described in detail below with reference to the accompanying drawings.

[Overall Configuration of Linear Conveyor]

Figure 1:
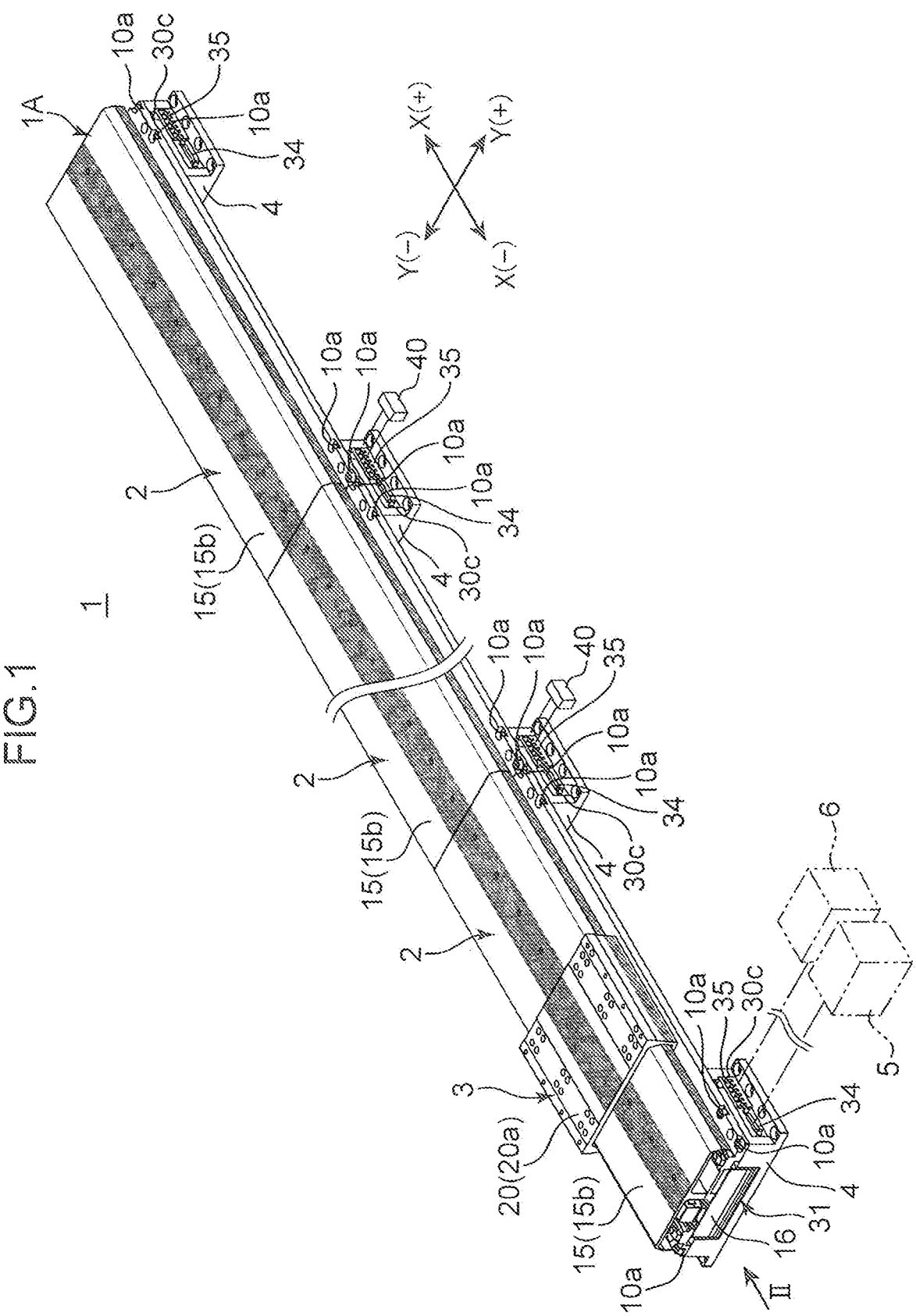
FIG. 1 is a perspective view of a linear conveyor according to an exemplary embodiment of the present disclosure.
Figure 2:
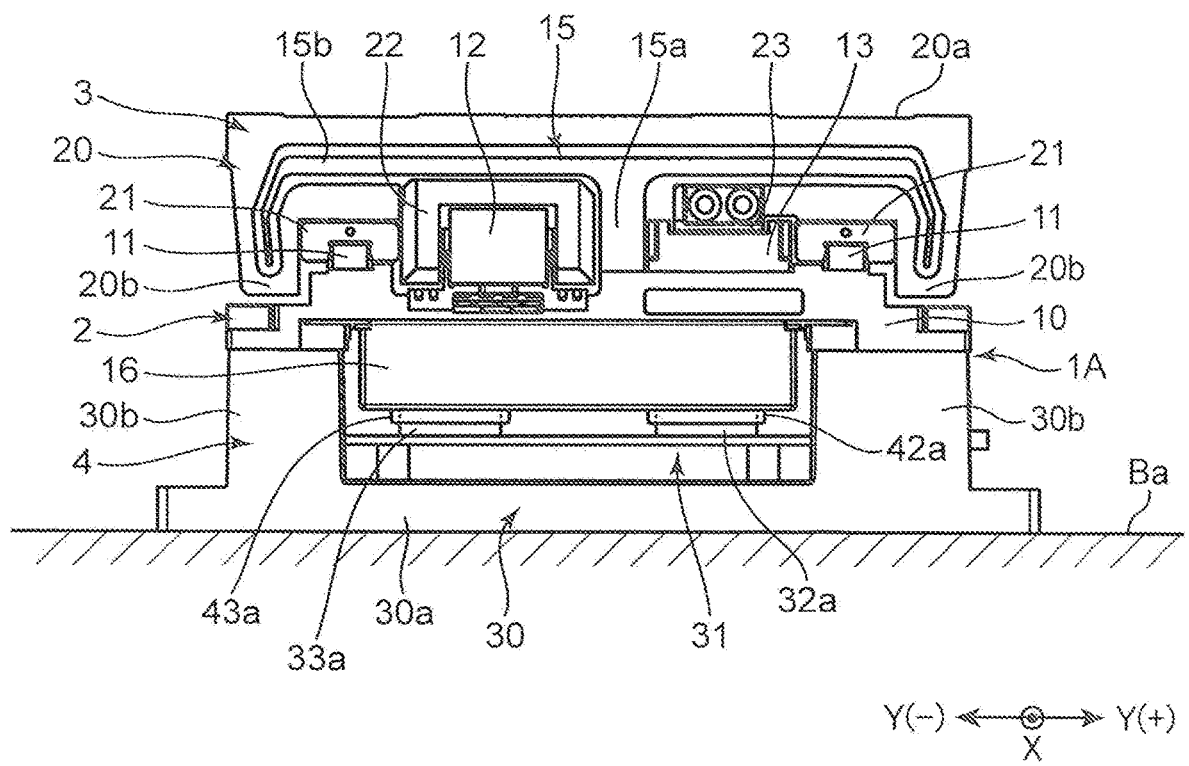
FIG. 2 is a side view of the linear conveyor viewed from an arrow II in FIG. 1.

FIG. 1 is a perspective view of a linear conveyor of the present disclosure. FIG. 2 is a side view of the linear conveyor viewed from an arrow II in FIG. 1.

A linear conveyor 1 illustrated in FIG. 1 and FIG. 2 includes a traveling section 1A as a conveyance path, and a slider 3 that travels along the traveling section 1A. The linear conveyor 1 has a module structure. The traveling section 1A includes a plurality of modules 2 connected in a row, a plurality of bridge support members 4 that supports the modules 2 on a base Ba, a centralized controller 5 that controls traveling of the slider 3, and a power supply device 6.

In this example, the traveling section 1A has a linear shape and an end, and the slider 3 reciprocates along the traveling section 1A. In the following description, a direction parallel with the traveling section 1A (the conveyance path) is referred to as an X direction, and a direction perpendicular to the X direction on a horizontal surface (the base Ba) is referred to as a Y direction. One side in the X direction (a right side in FIG. 1) is referred to as an X(+) side, and a side opposite to the X(+) side is referred to as an X(−) side. One side in the Y direction (a front side in FIG. 1) is referred to as a Y(+) side, and a side opposite to the Y(+) side is referred to as a Y(−) side. Since a direction perpendicular to both the X direction and the Y direction is an up-down direction, this is simply referred to as the up-down direction.

The modules 2 have identical structures. Each of the modules 2 includes a base frame 10 configured by a metallic structure that is rectangular in plan view and is long and narrow in the X direction, a pair of rails 11 that extends parallel with each other in the X direction, a plurality of electromagnets 12 and a plurality of scale detectors 13 that are disposed along the rails 11, a cover frame 15, and a module controller 16.

Each of the electromagnets 12 configures a linear motor stator, and each of the scale detectors 13, together with a magnetic scale 23 described later, configure a linear scale (also referred to as a linear encoder).

The pair of rails 11 is disposed in positions near both ends, respectively, in the Y direction on an upper surface of each of the base frames 10. The plurality of electromagnets 12 and the plurality of scale detectors 13 are disposed side by side between the rails 11 (at intervals in the Y direction). Specifically, the electromagnets 12 are disposed side by side on the Y(−) side, and the scale detectors 13 are disposed side by side on the Y(+) side.

The rails 11, the electromagnets 12, and the scale detectors 13 are covered by the cover frame 15 fixed to the upper surface of the base frame 10. More specifically, the cover frame 15 has an approximately T-shaped cross section that includes a leg section 15a that extends up from positions between the electromagnets 12 and the scale detectors 13, and a cover section 15b that extends from an upper end of the cover frame 15 in the Y direction so as to cover the rails 11, the electromagnets 12, and the scale detectors 13. The cover section 15b extends over the entire module in the X direction, and thus the rails 11, the electromagnets 12, and the scale detectors 13 are entirely covered by the cover frame 15.

The module controller 16 is fixed to a lower surface of the base frame 10. The module controller 16 is for controlling energizing of the electromagnets 12, and thus controls energizing of the electromagnets 12 based on information to be transmitted from the centralized controller 5 and information to be detected by the scale detectors 13.

The module controller 16 is electrically connected to the module controller 16 of the adjacent module 2 via a relay unit 31, described later, and is electrically connected to the centralized controller 5 or the power supply device 6. This point will be described in detail later.

The plurality of modules 2 are fixed to the bridge support members 4, respectively, with end surfaces in the X direction abutting against each other, and is connected to each other in a row via the bridge support members 4. The respective modules 2 connected to each other in such a manner cooperate to constitute the traveling section 1A.

On the other hand, the slider 3 includes a frame 20, a pair of guide blocks 21, a magnet unit 22, and the magnetic scale 23.

The frame 20 includes, as illustrated in FIG. 2, a table section 20a that has a rectangular or square shape in planar view and is positioned above the cover frame 15, and a pair of leg sections 20b that extend down from both ends of the table section 20a in the Y direction and comes to an inside of the cover frame 15 (the cover section 15b). The guide blocks 21 are fixed to lower surfaces of the leg sections 20b, respectively. The guide blocks 21 are slidably attached to the rails 11, respectively. As a result, the slider 3 is movable along the rails 11, namely, the traveling section 1A.

The magnet unit 22 is further fixed to the leg sections 20b on the Y(−) side in the two leg sections 20b of the frame 20, and the magnetic scale 23 is further fixed to the leg section 20b on the Y(+) side.

The magnet unit 22 configures a linear motor mover. The magnet unit 22 has a plurality of permanent magnets disposed in the X direction, and a pair of magnet columns (not illustrated) disposed on both ends of the electromagnets 12 (both sides in the Y direction). On the other hand, the magnetic scale 23 constitute a linear scale together with the scale detectors 13, and the magnetic scale 23 is fixed to a position, in the leg section 20b, opposite to the scale detectors 13.

In this configuration, when the energizing of the electromagnets 12 of each of the modules 2 is controlled, a driving force is generated in the slider 3 by an interaction between magnetic fluxes to be generated in the electromagnets 12 and magnetic fluxes of the permanent magnets. This driving force causes the slider 3 to travel along the rails 11, namely, along the traveling section 1A. Note that in FIG. 1, one slider 3 is provided but a plurality of sliders 3 may be provided.

The plurality of modules 2 constituting the traveling section 1A are supported by the base Ba via the bridge support members 4. For details, the bridge support members 4 are disposed on an end part of the module 2 on the X(+) side at an end of the traveling section 1A on the X(+) side, connecting portions of the adjacent modules 2, and an end part of the module 2 on the X(−) side at an end of the traveling section 1A on the X(−) side, respectively. The modules 2 are supported to the base Ba via the bridge support members 4.

The modules 2 are fixed to the bridge support members 4 by bolts. Specifically, bolt holes 10a are formed on both X-directional ends and both Y-directional ends of the base frame 10 of each of the modules 2. Bolts are inserted into the bolt holes 10a, respectively, and the bolts are screwed into screw holes provided on the bridge support members 4 so that the modules 2 are fixed to the bridge support members 4. In this example, as illustrated in FIG. 1, a pair of the bolt holes 10a that is disposed at an equal interval in the X direction is formed on both the X-directional ends and both the Y-directional ends of the base frame 10. On the other hand, four screw holes (not illustrated) that are disposed in the X direction are formed on both Y-directional ends of the upper surface of the bridge support members 4. The screw holes are formed in positions that are related to the bolt holes 10a of the modules 2 when a set of adjacent modules 2 abut against each other at a center of each bridge support member 4 in the X direction.

Note that the screw holes of the bridge support members 4 are provided so as to be aligned with the bolt holes 10a when the modules 2 are shifted with respect to the bridge support members 4 so that the end surfaces of the modules 2 are aligned with the end surfaces of the bridge support members 4 in the X direction. For this reason, at the ends of the traveling section 1A, as illustrated in FIG. 1, the bridge support members 4 are disposed so that the ends of the modules 2 are aligned with the ends of the bridge support members 4, and the modules 2 are fixed to the bridge support members 4, respectively, in this state.

The bridge support members 4 have identical configurations. Each of the bridge support members 4 includes a leg body 30 having the screw holes, and the relay unit 31 installed into the leg body 30.

Each of the leg bodies 30 is a metallic structure, and has an approximately U shape in cross-sectional view. Each of the leg bodies 30 includes a base section 30a having a rectangular flat-plate shape in plan view, and a pair of module mounting sections 30b that protrudes upward from an upper surface of the leg body 30 and extends parallel with each other in the X direction.

The module mounting sections 30b have flat upper surfaces having the screw holes, and the modules 2 are supported to the upper surfaces so as to be fixed to the module mounting sections 30b by bolts. The relay unit 31 electrically connects (relays) the module controllers 16 of the adjacent modules 2, and electrically connects (relays) the centralized controller 5 or the power supply device 6 to the module controllers 16.

Herein, configurations of the module controller 16 and the relay unit 31 are described in detail.

The module controller 16 is, as illustrated in FIG. 3, configured by a circuit board such as a printed wiring board that is long and narrow in the X direction. The module controller 16 is provided with a first communication connector 42a and a first power supply connector 43a that are disposed in the Y direction in a position near the end of the module 2 on the X(−) side, and a second communication connector 42b and a second power supply connector 43b that are disposed in the Y direction in a position near the end of the module 2 on the X(+) side at an interval equal to the interval of the connectors 42a, 43a. The first and second communication connectors 42a, 42b are positioned on the Y(+) side, and the first power supply connectors 43a, 43b are positioned on the Y(−) side.

Each of the connectors 42a, 42b, 43a, 43b is, for example, an on-board type male connector, and includes a male connector housing and a female connector terminal held to the male connector housing, not illustrated in detail. The connector terminal is electrically connected to the circuit on the circuit board. The connectors 42a, 42b, 43a, 43b are provided on lower surfaces of the module controllers 16 (the circuit boards) facing down so as to be capable of being inserted into or extracted from counterpart connectors (first to fourth counterpart communication connectors 32a to 32d and first to fourth counterpart power supply connectors 33a to 33d, described later) provided on the relay unit 31 side in an up-and-down direction.

The relay units 31 is also configured by a circuit board such as a printed wiring board similarly to the module controller 16. The relay unit 31 is, as illustrated in FIG. 2, disposed between the pair of module mounting sections 30b of the bridge support member 4 (the leg body 30), and is fixed to the base section 30a via a spacer.

FIG. 4 is a planar schematic diagram of the relay unit 31. FIG. 4 is the planar schematic diagram of the relay unit 31, so (+) and (−) in the Y direction are reversed from those in FIG. 3.

As illustrated in FIG. 4, the relay unit 31 is provided with counterpart connectors to be selectively connected to the first and second communication connectors 42a, 42b and the first and second power supply connectors 43a, 43b of the module controller 16 (the module 2). Specifically, the relay unit 31 is provided with four first to fourth counterpart communication connectors 32a to 32d disposed in a row at predetermined intervals in the X direction, and four first to fourth counterpart power supply connectors 33a to 33d disposed in a row in the X direction on the Y(−) side similarly to the counterpart communication connectors 32a to 32d. That is, the first counterpart communication connector 32a and the first counterpart power supply connector 33a are disposed side by side in the Y direction. The second counterpart communication connector 32b and the second counterpart power supply connector 33b are disposed side by side in the Y direction. The third counterpart communication connector 32c and the third counterpart power supply connector 33c are disposed side by side in the Y direction. The fourth counterpart communication connector 32d and the fourth counterpart power supply connector 33d are disposed side by side in the Y direction. Note that an interval in the Y direction between the first to fourth counterpart communication connectors 32a to 32d and the first to fourth counterpart power supply connectors 33a to 33d corresponds to an interval in the Y direction between the first communication connector 42a and the first power supply connector 43a (the second communication connector 42b and the second power supply connector 43b) of the module controller 16.

The first and third counterpart communication connectors 32a, 32c are connected to the first communication connector 42a of the module controller 16. The second and fourth counterpart communication connectors 32b, 32d are connected to the second communication connector 42b of the module controller 16. Further, the first and third counterpart power supply connectors 33a, 33c are connected to the first power supply connector 43a of the module controller 16. The second and fourth counterpart power supply connectors 33b, 33d are connected to the second power supply connector 43b of the module controller 16.

The counterpart communication connectors 32a to 32d are female connectors that can be fitted into the corresponding communication connectors 42a, 42b of the module controller 16. Similarly, the counterpart power supply connectors 33a to 33d are also female connectors that can be fitted to the corresponding power supply connectors 43a, 43b of the module controller 16. The connectors 32a to 32d, 33a to 33d are on-board type connectors, and include female connector housings and male connector terminals held to female connector housings, not illustrated in detail. The connector terminals are electrically connected to the circuit on the circuit board.

The first to fourth counterpart communication connectors 32a to 32d and the first to fourth counterpart power supply connectors 33a to 33d are provided facing upward on the relay unit 31 (the circuit board) so as to be inserted into or extracted from the first and second communication connectors 42a, 42b and first and second power supply connectors 43a, 43b, respectively, in the vertical direction.

The relay unit 31 is further provided with a communication port connector 34 and a power supply port connector 35. The connectors 34, 35 are arranged in the X direction along an edge of the relay unit 31 on the Y(+) side. Specifically, the communication port connector 34 and the power supply port connector 35 are disposed in this order from the X(−) side. The connectors 34, 35 are also on-board type female connectors similarly to the other connectors 32a to 32d, 33a to 33d of the relay unit 31.

The communication port connector 34 and the power supply port connector 35 are mounted on the circuit board to face the Y(+) side so that the counterpart connectors (connection wiring connectors of the centralized controller 5 and the power supply device 6) can be inserted into or extracted from the communication port connector 34 and the power supply port connector 35 in a lateral direction (the Y direction). Note that, as illustrated in FIG. 1, openings 30c are formed on the module mounting section 30b of the leg body 30 so as to penetrate in the lateral direction, and the connectors 34, 35 are exposed from the openings 30c on the Y(+) side. As a result, the counterpart connectors can be inserted into or extracted from the connectors 34, 35 on an outside (the Y(+) side) of the bridge support member 4 (the leg body 30).

The relay unit 31 is provided with a first communication circuit 36 that connects the first counterpart communication connector 32a and the fourth counterpart communication connector 32d to the communication port connector 34, a second communication circuit 37 that connects the second counterpart communication connector 32b to the third counterpart communication connector 32c, a first power supply circuit 38 that connects the second counterpart power supply connector 33b and the fourth counterpart power supply connector 33d to the power supply port connector 35, and a second power supply circuit 39 that connects the first counterpart power supply connector 33a and the third counterpart power supply connector 33c to the power supply port connector 35. The circuits 36 to 39 are electrically independent from each other.

Note that the first power supply circuit 38 and the second power supply circuit 39 are connected to different connector terminals 35a, 35b (see FIG. 6B) of the power supply port connector 35, respectively. When a short-circuit connector 40, described later, is connected to the power supply port connector 35, the first power supply circuit 38 and the second power supply circuit 39 are conductive, and the first and third counterpart power supply connectors 33a, 33c are electrically connected to the second and fourth counterpart power supply connectors 33b, 33d.

Herein, in the bridge support members 4, a position of the bridge support members 4 to be disposed at the end of the traveling section 1A on the X(−) side is defined as a first end position P1. Positions of the bridge support members 4 to be disposed on connecting positions of the adjacent modules 2 are defined as connecting positions P2. A position of the bridge support member 4 to be disposed at an end of the traveling section 1A on the X(+) side is defined as a second end position P3. At this time, in a relation among the positions P1 to P3, the connectors 32a to 32d, 33a to 33d in the relay units 31 are provided with respect to the connectors 42a, 42b, 43a, 43b in the module controllers 16 (the modules 2) as follows.

As schematically illustrated in FIG. 5, positions of the second counterpart communication connectors 32b and the second counterpart power supply connectors 33b of the relay units 31, and positions of the third counterpart communication connectors 32c and the third counterpart power supply connectors 33c are set. At this time, in a state where the bridge support members 4 are disposed in the connecting positions P2, the second communication connectors 42b and the second power supply connectors 43b of the module 2 on the X(−) side are opposite to the second counterpart communication connectors 32b and the second counterpart power supply connectors 33b of the relay units 31, and the first communication connectors 42a and the first power supply connectors 43a of the modules 2 on the X(+) side are opposite to the third counterpart communication connectors 32c and the third counterpart power supply connectors 33c of the relay units 31.

Further, positions of the first counterpart communication connector 32a and the first counterpart power supply connector 33a of the relay unit 31 are set so that, in a state where the bridge support member 4 is disposed in the first end position P1, the first communication connector 42a and the first power supply connector 43a of the module 2 are opposite to the first counterpart communication connector 32a and the first counterpart power supply connector 33a of the relay unit 31.

Furthermore, positions of the fourth counterpart communication connector 32d and the fourth counterpart power supply connector 33d of the relay unit 31 are set so that, in a state where the bridge support member 4 is disposed in the second end position P3, the second communication connector 42b and the second power supply connector 43b of the module 2 are opposite to the fourth counterpart communication connector 32d and the fourth counterpart power supply connector 33d of the relay unit 31.

With this configuration, in the linear conveyor 1, the second communication connector 42b and the second power supply connector 43b of the module 2 (the module controller 16) on the X(−) side in the adjacent modules 2 are connected to the second counterpart communication connector 32b and the second counterpart power supply connector 33b of the relay unit 31 (the bridge support member 4) in each of the connecting positions P2, respectively. Further, the first communication connector 42a and the first power supply connector 43a of the module 2 on the X(+) side are connected to the third counterpart communication connector 32c and the third counterpart power supply connector 33c of the relay unit 31, respectively.

Further, the first communication connector 42a and the first power supply connector 43a of the module 2 at the end on the X(−) side are connected to the first counterpart communication connector 32a and the first counterpart power supply connector 33a of the relay unit 31 in the first end position P1, respectively. Furthermore, the second communication connector 42b and the second power supply connector 43b of the module 2 at the end on the X(+) side are connected to the fourth counterpart communication connector 32d and the fourth counterpart power supply connector 33d of the relay unit 31 in the second end position P3, respectively.

Note that the relay unit 31 of the bridge support member 4 disposed in the first end position P1 is, as illustrated in FIG. 1, connected to the centralized controller 5 and the power supply device 6. That is, a connector, not illustrated, provided on the connecting wire of the centralized controller 5 is connected to the communication port connector 34. Further, a connector, not illustrated, provided on the connecting wire of the power supply device 6 is connected to the power supply port connector 35. As a result, the module 2 at the end on the X(−) side is, as illustrated in FIG. 6A and FIG.

Figure 8:
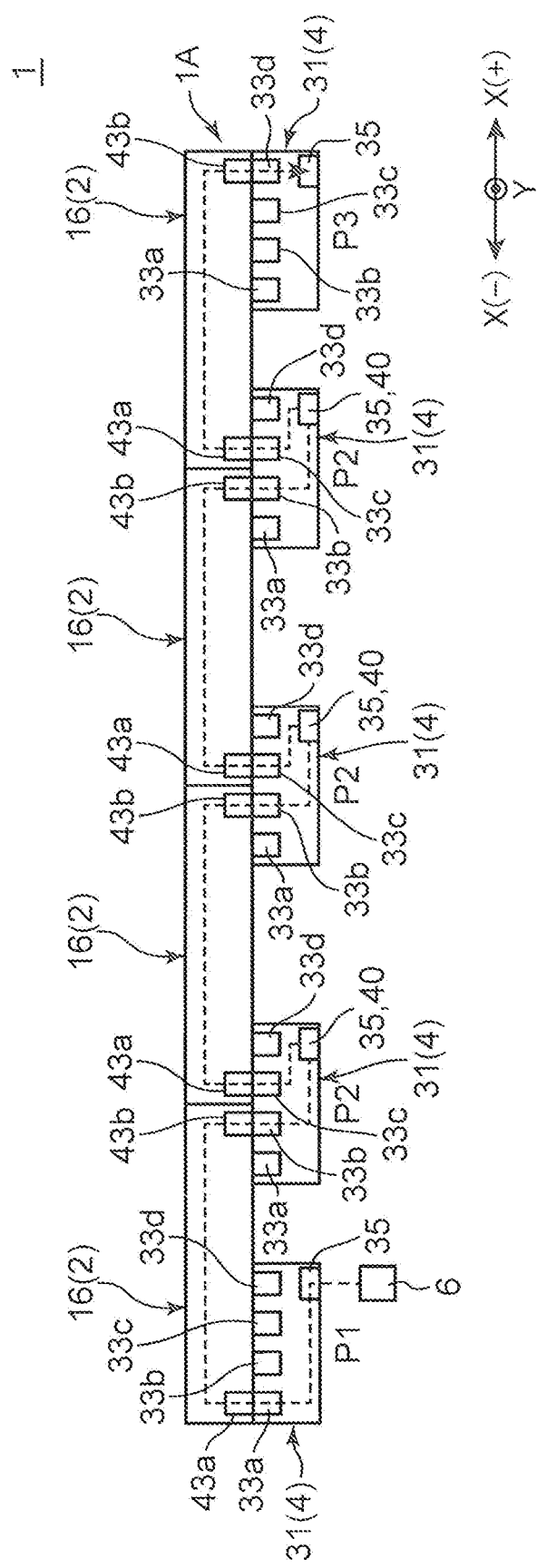
FIG. 8 is a schematic diagram of the linear conveyor illustrating a power feeding path.

7, electrically connected to the centralized controller 5 via the first communication connector 42a, the first counterpart communication connector 32a, the first communication circuit 36, and the communication port connector 34. The module 2 is, as illustrated in FIG. 6A and FIG. 8, further connected to the power supply device 6 via the first power supply connector 43a, the first counterpart power supply connector 33a, the second power supply circuit 39, and the power supply port connector 35.

Further, the short-circuit connector 40 is connected to the relay unit 31 of the bridge support members 4 disposed in each of the connecting positions P2, as illustrated in FIG. 1. The short-circuit connector 40 causes the first power supply circuit 38 and the second power supply circuit 39 to become short into a conductive state. That is, the connector terminal 35a to be linked to the first power supply circuit 38 and the connector terminal 35b to be linked to the second power supply circuit 39 are held on the power supply port connector 35, whereas the short-circuit connector 40 includes a connector terminal and a circuit that come in contact with the connector terminals 35a, 35b and connect these terminals. As a result, in a state where the short-circuit connector 40 is connected to the power supply port connector 35, the first power supply circuit 38 and the second power supply circuit 39 are connected to each other. In a state where the short-circuit connector 40 is disconnected from the power supply port connector 35, the first power supply circuit 38 and the second power supply circuit 39 are disconnected.

Figure 7:
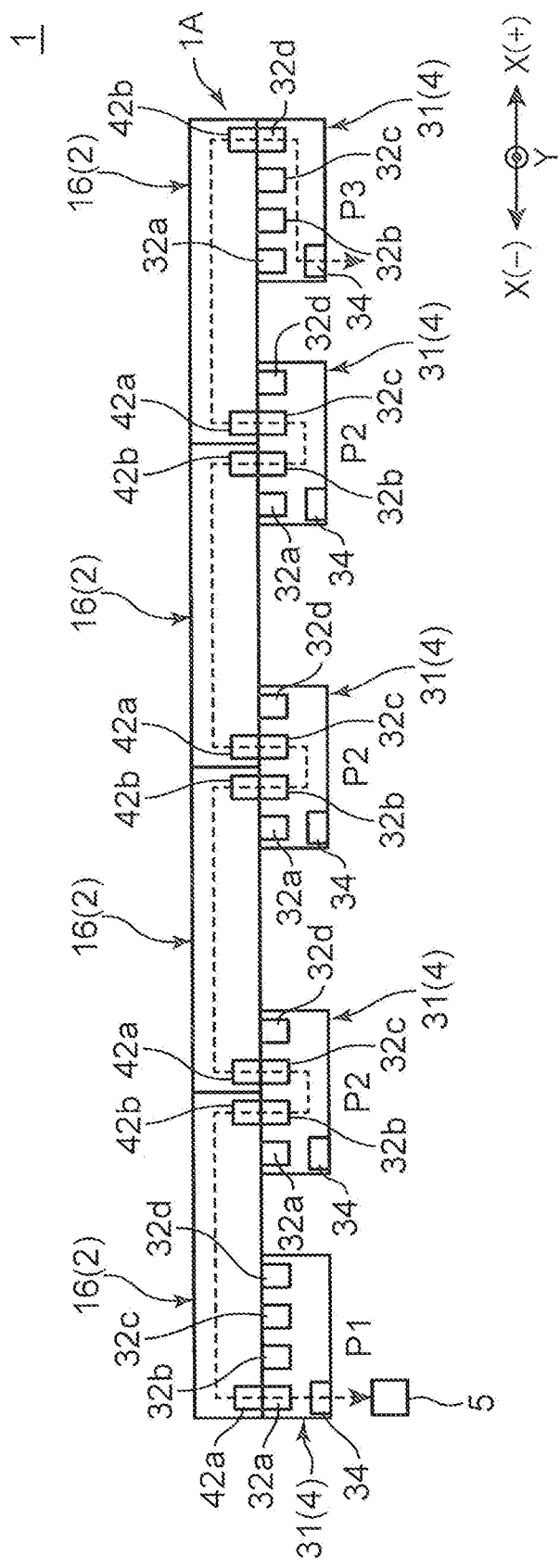
FIG. 7 is a schematic diagram of the linear conveyor illustrating a communication path.

The short-circuit connectors 40 are connected to the relay units 31 of the bridge support members 4 disposed in the connecting positions P2, respectively, as described above. For this reason, as illustrated in FIG. 6A and FIG. 7, the modules 2 adjacent to each other are communicably connected to each other via the second communication connector 42b, the second counterpart communication connector 32b, the second communication circuit 37, the third counterpart communication connector 32c, and the first communication connector 42a. Further, as illustrated in FIG. 6A and FIG. 8, the modules 2 adjacent to each other are connected to each other via the second power supply connector 43b, the second counterpart power supply connector 33b, the first power supply circuit 38, the power supply port connector 35, the short-circuit connector 40, the power supply port connector 35, the second power supply circuit 39, the third counterpart power supply connector 33c, and the first power supply connector 43a so that electric power can be supplied.

Note that the module controller 16 is provided with a communication relay circuit that connects the first communication connector 42a and the second communication connector 42b, and a power supply relay circuit that connects the first power supply connector 43a and the second power supply connector 43b, not illustrated, as a part of the circuit.

As a result, the plurality of modules 2 that constitute the traveling section 1A and the centralized controller 5 are communicably connected to each other, and the power supply device 6 and the plurality of modules 2 are connected to each other so that electric power can be supplied. That is, as illustrated in FIG. 7 and FIG. 8, a control signal to be transmitted from the centralized controller 5 is transmitted to the module 2 at the end on the X(−) side via the relay unit 31 of the bridge support member 4 disposed in the first end position P1, and successively transmitted from the module 2 to the adjacent modules 2 via the relay units 31 of the bridge support members 4. Further, electric power from the power supply device 6 is similarly supplied to the module 2 at the end on the X(−) side via the relay unit 31 of the bridge support member 4 disposed in the first end position P1, and supplied from this module 2 successively to the adjacent modules 2 via the relay units 31 of the bridge support members 4.

Note that, in an example of FIG. 8, electric power to be supplied to the module 2 at the end on the X(−) side is supplied to the adjacent modules 2 via the bridge support members 4 (the relay units 31). Alternatively, the electric power can be supplied to the modules 2 in a middle portion of the traveling section 1A.

Figure 9:
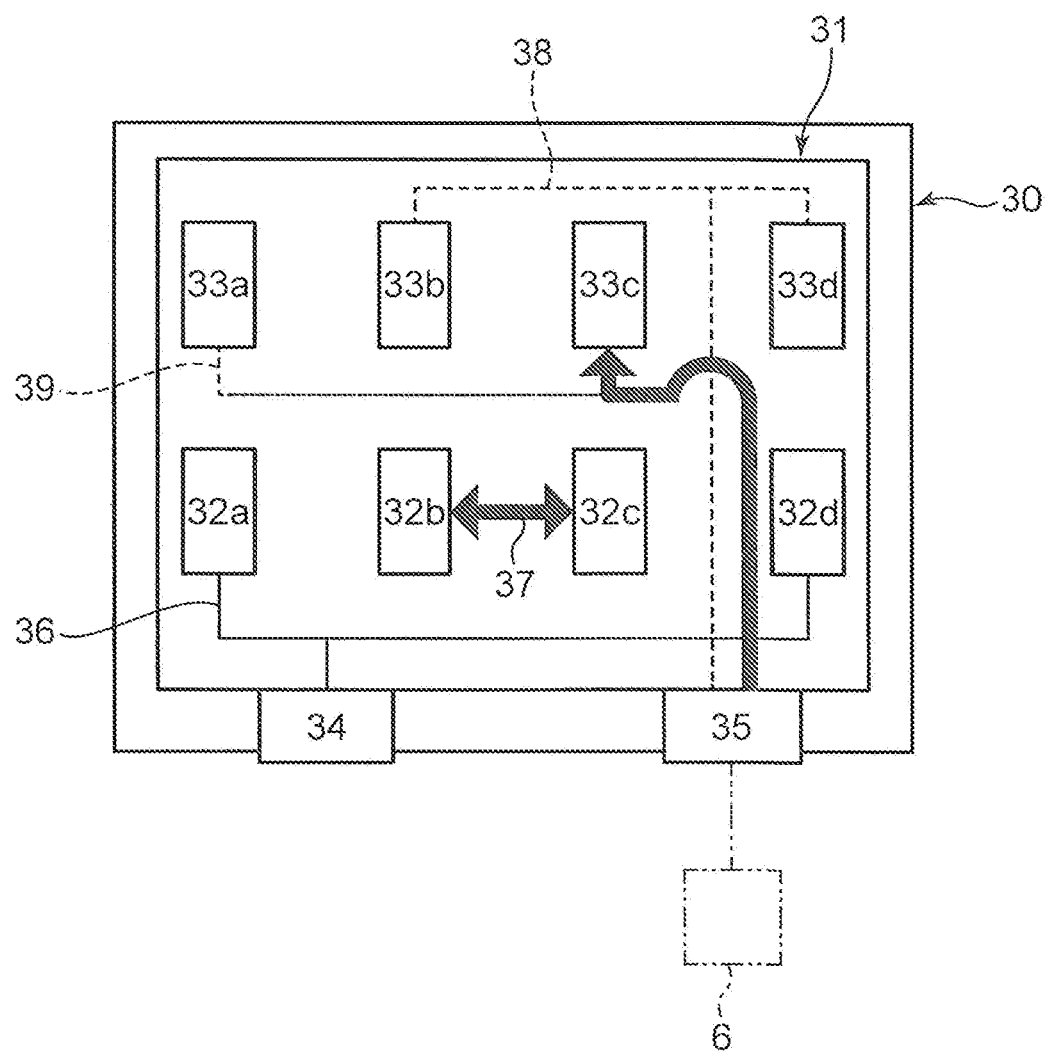
FIG. 9 is a planar schematic diagram illustrating an energized state of the relay unit in a case where electric power is supplied via the relay unit disposed on the connecting position.
Figure 10:
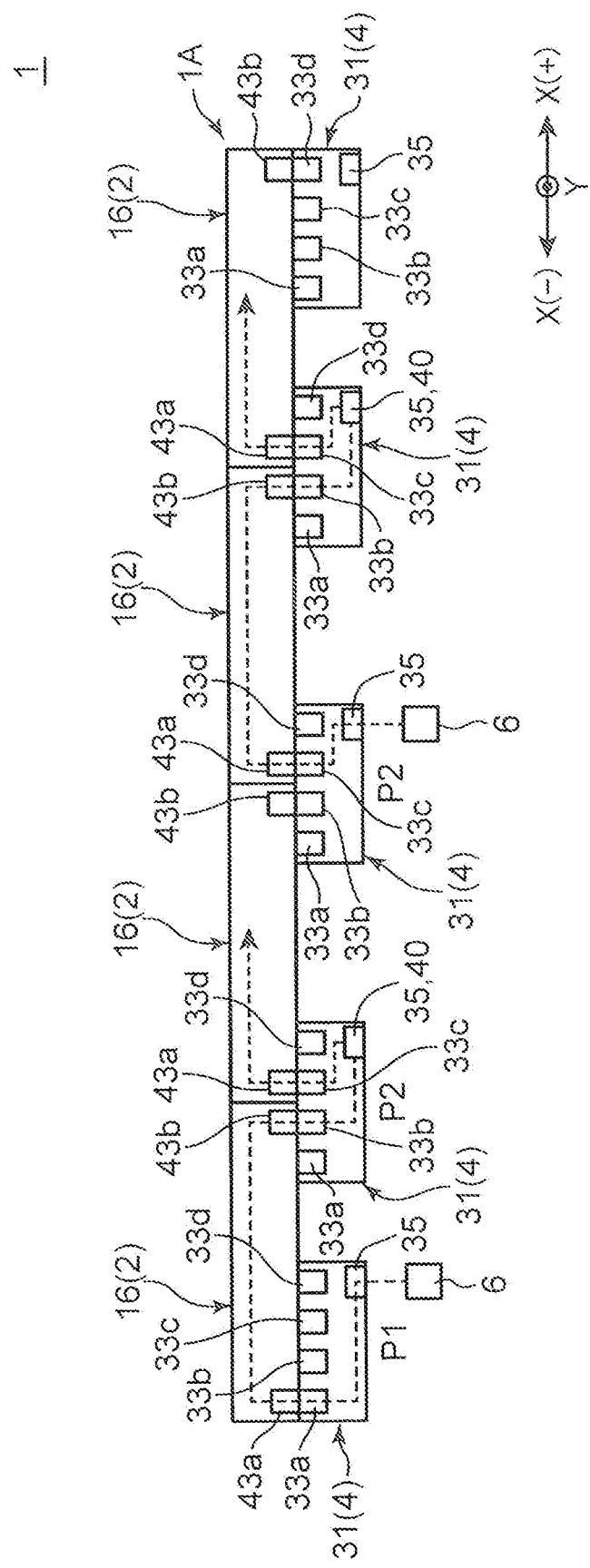
FIG. 10 is a schematic diagram of the linear conveyor illustrating a power feeding path.

FIG. 10 illustrates a specific example of the supply of the electric power. That is, in the linear conveyor 1 illustrated in FIG. 10, the power supply device 6 is further connected to the relay unit 31 of the bridge support member 4 disposed in the second connecting position P2 from the X(−) side in the connecting positions P2. More specifically, instead of the short-circuit connector 40, a connector, not illustrated, of the connecting wire of the power supply device 6 is connected to the power supply port connector 35 of the relay unit 31, and the power supply device 6 is connected to the second power supply circuit 39 via the connector terminal 35b. As a result, as illustrated in FIG. 9 and FIG. 10, the electric power from the power supply device 6 is supplied to the module 2 (in FIG. 10, the second module 2 from the X(+) side) via the power supply port connector 35, the second power supply circuit 39, the third counterpart power supply connector 33c, and the first power supply connector 43a. That is, in this configuration, the electric power is supplied to the two modules 2 on the X(−) side and to the two modules 2 on the X(+) side from the different power supply devices 6, respectively. Such a configuration is effective for a case where one power supply device 6 cannot cover the power supply to the plurality of modules 2 constituting the traveling section 1A.

Herein, a correlation between the above-described configuration of the linear conveyor 1 according to the exemplary embodiment and the present disclosure will be described below.

In the linear conveyor 1, the modules 2 positioned at the ends of the traveling section 1A on the X(+) side and on the X(−) side correspond to the end modules of the present disclosure.

Further, in the linear conveyor 1, the first communication connector 42a and the first power supply connector 43a of the module controller 16 correspond to first module-side connection sections of the present disclosure, and the second communication connector 42b and the second power supply connector 43b correspond to second module-side connection sections of the present disclosure.

Further, each of the second counterpart communication connector 32b and the second counterpart power supply connector 33b of the relay unit 31 corresponds to first unit-side connection sections of the present disclosure, and each of the third counterpart communication connector 32c and the third counterpart power supply connector 33c corresponds to second unit-side connection sections of the present disclosure. The second communication circuit 37 corresponds to a first circuit unit of the present disclosure, and the first and second power supply circuits 38, 39, the power supply port connector 35, and the short-circuit connector 40 correspond to the first circuit units of the present disclosure.

Further, each of the first counterpart communication connector 32a and the first counterpart power supply connector 33a of the relay unit 31 corresponds to third unit-side connection sections of the present disclosure. Each of the communication port connector 34 and the power supply port connector 35 corresponds to a fourth unit-side connection section of the present disclosure, and each of the first communication circuit 36 and the second power supply circuits 39 corresponds to a second circuit unit of the present disclosure.

Further, the power supply port connector 35 and the short-circuit connector 40 correspond to switching members of the present disclosure, and the connector terminal 35b of the power supply port connector 35 corresponds to a power supply connection section of the present disclosure.

[Operation Effect of Linear Conveyor]

In the linear conveyor 1, the relay unit 31 is disposed across a set of adjacent modules 2, and the set of modules 2 (the module controllers 16) is connected directly to the relay unit 31 by the connectors so as to be electrically connected to each other via the relay unit 31. Specifically, the second communication connector 42b and the second power supply connector 43b of the module 2 on the X(−) side are connected to the second counterpart communication connector 32b and the second counterpart power supply connector 33b of the relay unit 31, and the first communication connector 42a and the first power supply connector 43a of the module 2 on the X(+) side are connected to the third counterpart communication connector 32c and the third counterpart power supply connector 33c of the relay unit 31. As a result, the set of modules 2 is electrically connected to each other via the relay unit 31.

For this reason, the traveling section 1A employs the module structure including the plurality of modules 2, and simultaneously the modules 2 can be electrically connected to each other without using an electric wire (a wire harness). Therefore, the communication wires and the power-supply wires can be reduced as compared to this kind of conventional linear conveyor (Japanese Patent No. 5753060 in the background art), and thus space-saving and assemblability can be improved for the linear conveyor 1.

Particularly in the linear conveyor 1, since the relay units 31 are provided to the bridge support members 4 that support the modules 2, respectively, the adjacent modules 2 can be electrically connected to each other simultaneously with the assembly of the traveling section 1A. That is, at the time of assembly of the traveling section 1A, for example, the bridge support members 4 are disposed at constant intervals, the modules 2 are disposed across the adjacent bridge support members 4, and the modules 2 are then fixed to the bridge support members 4 by bolts. At this time, when the modules 2 are disposed across the bridge support members 4, the communication connectors 42a, 42b and the power supply connectors 43a, 43b of the modules 2 are connected to the counterpart communication connectors 32a to 32d and the counterpart power supply connectors 33a to 33d of the relay units 31, so that the modules 2 can be mechanically installed to the bridge support members 4 simultaneously with the electric connection of the modules 2 to the relay units 31. For this reason, the number of assembly steps can be reduced as compared to this kind of conventional linear conveyor that needs to do cabling and connecting work for the electric wires (the wire harnesses) separately from the mechanical assembly of the linear conveyor 1. Therefore, this point also contributes to an improvement in the assemblability of the linear conveyor 1.

Further, in the linear conveyor 1, the bridge support members 4 disposed in the first end position P1, the connecting positions P2, and the second end position P3, respectively, have identical structures, and as described above, the modules 2 are disposed on the bridge support members 4 disposed in the respective positions P1 to P3. As a result, the positions of the connectors 32a to 32d, 33a to 33d of the relay units 31 are set so that the connectors 42a, 42b, 43a, 43b of the modules 2 (the module controllers 16) are opposite to the desirable connectors 32a to 32d, 33a to 33d of the relay units 31. For this reason, in the linear conveyor 1, a trouble such that the bridge support members 4 have inappropriate specifications in the assembly is not caused. Therefore, this point also contributes to an improvement in the assemblability of the linear conveyor 1.

Further, in the linear conveyor 1, since the modules 2 can be electrically connected to each other without using electric wires (wire harnesses), even if a whole length of the traveling section 1A is desired to be changed, the length can be quickly changed only by adding the module 2 and the bridge support member 4 to a middle portion of the traveling section 1A, or removing the module 2 and the bridge support member 4 from the middle portion of the traveling section 1A and fixing the modules 2 on both sides of the removed module 2 and the bridge support member 4. For this reason, addition or a change of electric wires (wire harnesses) is not necessary. Therefore, the whole length of the traveling section 1A can be changed more simply.

Further, even in a case where any module 2 constituting the traveling section 1A is in failure, the failure can be eliminated immediately only by replacing the module 2. For this reason, maintainability of the traveling section 1A is excellent.

Further, in the linear conveyor 1, other than a power supply form in which the power supply device 6 is connected to the relay unit 31 of the bridge support member 4 in the first end position P1, and electric power is successively supplied to the adjacent modules 2 starting from the module 2 at the end of the X(−) side, as illustrated in FIG. 10, the power supply device 6 may be added so that electric power is supplied to the modules 2 in a middle portion of the traveling section 1A. For this reason, the electric power can be supplied appropriately to the respective modules 2 based on the specific configuration of the traveling section 1A. Particularly, in a case where the traveling section 1A is extended later, as the number of the modules 2 increases, it is considered that electric power becomes insufficient in some of the modules 2. However, in the linear conveyor 1, the power supply device 6 is added later so that a power shortage can be eliminated. Furthermore, when the power supply device 6 is added, instead of the short-circuit connector 40, the connector of the power supply device 6 may be connected to the power supply port connector 35 of the relay unit 31 so that the power supply device 6 is added. For this reason, the power supply device 6 can be added very easily.

[Modifications]

The linear conveyor 1 according to the exemplary embodiment is a preferable example of the linear conveyor of the present disclosure, and thus the specific configuration of the linear conveyor can be appropriately modified without departing from the scope of the present disclosure. For example, the following configurations can be adopted.

(1) In the exemplary embodiment, the linear conveyor 1 includes only traveling section 1A. However, for example, two traveling sections 1A are disposed in parallel, and a transfer device transfers the slider 3 from an end of one traveling section 1A to an end of the other traveling section 1A so as to cause the slider 3 to travel across the two traveling sections 1A. In this case, the communication port connector 34 of the relay unit 31 (the bridge support member) in the second end position P3 in the one traveling section 1A is connected to the communication port connector 34 of the relay unit 31 in the first end position P1 in the other traveling section 1A via an electric wire (a wire harness) so that the module 2 of the one traveling section 1A may be communicably connected to the module 2 of the other traveling section 1A. That is, the module 2 of the one traveling section 1A may be communicably connected to the module 2 of the other traveling section 1A via the fourth counterpart communication connector 32d, the first communication circuit 36, the communication port connector 34, and the electric wire (the wire harness) of the one relay unit 31, and the communication port connector 34 and the first counterpart communication connector 32a of the other relay unit 31.

In this case, the power supply port connector 35 of the relay unit 31 (the bridge support member) in the second end position P3 in the one traveling section 1A is connected to the power supply port connector 35 of the relay unit 31 in the first end position P1 in the other traveling section 1A similarly by an electric wire (a wire harness). As a result, the module 2 of the one traveling section 1A may be connected to the module 2 of the other traveling section 1A so that electric power can be supplied. Needless to say, the power supply device 6 may be connected directly to the relay unit 31 in the first end position P1 in the other traveling section 1A, so as to supply electric power to the other traveling section 1A.

Figure 11A:
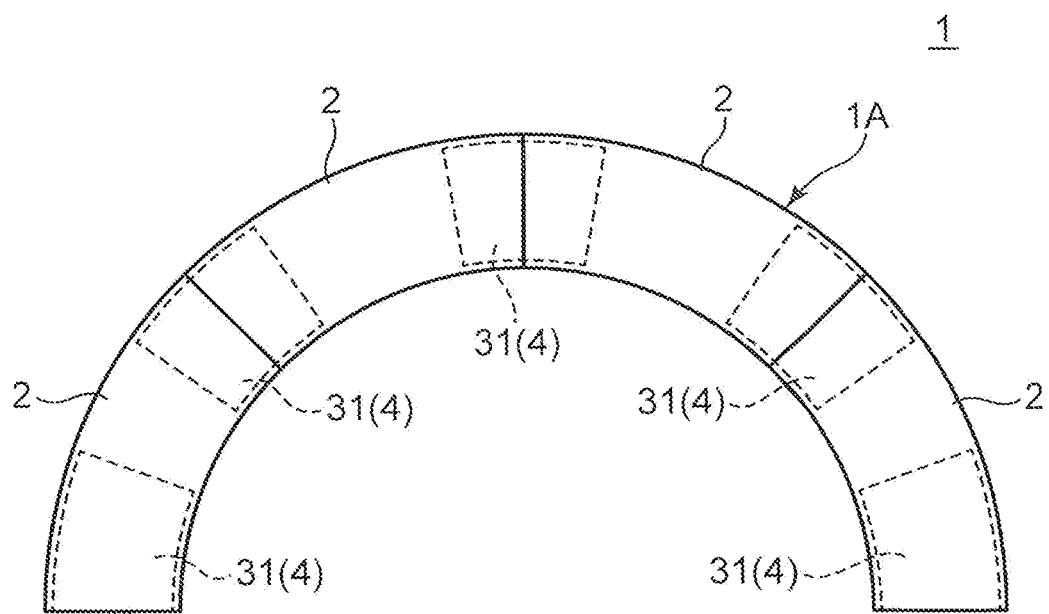
FIG. 11A is a planar schematic diagram of the linear conveyor according to a modified example.
Figure 11B:
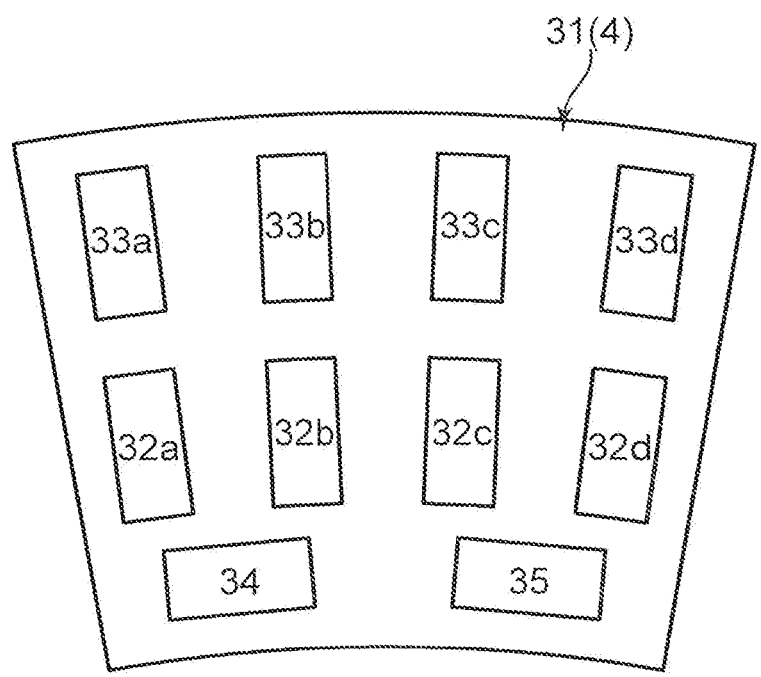
FIG. 11B is a planar schematic diagram of the relay unit to be applied to the linear conveyor in FIG. 11A.

(2) In the exemplary embodiment, the traveling section 1A of the linear conveyor 1 has a straight-linear shape, but the traveling section 1A may have an arc shape in plan view as illustrated in FIG. 11A. In this case, as illustrated in FIG. 11A, the modules 2 and the bridge support members 4 (the relay units 31) are configured into an arc shape in plan view, the connectors 32a to 32d, 33a to 33d, 34, 35 of the relay unit 31 are disposed along the arc shape of the relay unit 31 as illustrated in FIG. 11B.

Note that the shapes of the modules 2 and the relay units 31, and the arrangement of the connectors may be appropriately selected based on the specific shape of the traveling section 1A so that the communication and the power supply can be performed between the adjacent modules 2.

(3) In the exemplary embodiment, the linear conveyor 1 has one traveling section 1A, but as illustrated in FIG. 12, the linear conveyor 1 may have two traveling sections 1A, 1B (referred to as the first traveling section 1A and the second traveling section 1B) that are back-to-back, and the slider 3 may travel along the traveling sections 1A, 1B. In the linear conveyor 1 illustrated as an example in a plan view, the traveling sections 1A, 1B are in a rising posture, namely, the rails 11 are disposed up and down and is supported by the base Ba, and the slider 3 travels along side surfaces of the traveling sections 1A, 1B.

Connecting positions of the modules 2 in the first traveling section 1A and connecting positions of the modules in the second traveling section 1B are set in the same positions, and the common bridge support members 4 are disposed between both the traveling sections 1A, 1B. As a result, the modules 2 of the first traveling section 1A and the modules 2 of the second traveling section 1B are supported to the base Ba via the common bridge support members 4.

As illustrated in FIG. 12, in the relay units 31 of the bridge support members 4, the connectors 32a to 32d, 33a to 33d, 34, 35 associated with the modules 2 (the module controllers 16) of the first traveling section 1A are provided to the surface opposite to the modules 2 of the first traveling section 1A, and the connectors 32a to 32d, 33a to 33d, 34, 35 associated with the modules 2 of the second traveling section 1B are provided to the surfaces opposite to the modules 2 of the second traveling section 1B. That is, the connectors associated with the modules 2 of the first traveling section 1A and the connectors associated with the module 2 of the second traveling section 1B are provided back-to-back on the relay units 31.

In such a configuration, commonality of the relay units 31 is enabled between the two traveling sections (the conveyance paths), i.e., the first traveling section 1A and the second traveling section 1B. For this reason, wires such as communication wires and power supply wires can be reduced in the linear conveyor 1 having the two traveling sections 1A, 1B back-to-back, and a number of assembly steps of the linear conveyor 1 can be reduced.

(4) In the exemplary embodiment, in a case where the short-circuit connector 40 is detachable from the power supply port connector 35 of the relay unit 31, the first power supply circuit 38 and the second power supply circuit 39 are switched between a connected state and a disconnected state (namely, the second counterpart power supply connector 33b and the third counterpart power supply connector 33a are switched between the connected state and the disconnected state). However, instead of the short-circuit connector 40, for example, a change-over switch (corresponding to the switching member of the present disclosure) is disposed on the circuit board of the relay unit 31, and the first power supply circuit 38 and the second power supply circuit 39 may be switched between the connected state and the disconnected state by using the change-over switch.

(5) In the exemplary embodiment, the linear conveyor 1 includes the bridge support members 4 that support the traveling section 1A (the modules 2), and the relay units 31 are provided in the bridge support members 4, respectively. However, the bridge support members 4 may be omitted, and the traveling section 1A may be directly fixed to the base Ba.

The present disclosure described above will be summarized below.

The present disclosure is a linear conveyor including a plurality of modules that has rails and linear motor stators, respectively, and is connected to each other in a row to constitute a conveyance path, a slider that includes a linear motor mover and travels along the conveyance path, and at least one relay unit that is disposed across a set of modules adjacent to each other in a connecting position of the set of modules. The plurality of modules are configured such that each of the plurality of modules has first and second module-side connection sections provided on identical surfaces at both ends in a direction along the conveyance path, the plurality of modules being connected in a row in a state that the first module-side connection sections are located on one side in the direction along the conveyance path. The relay unit includes a first unit-side connection section that is provided in a position opposite to the second module-side connection section in one of the set of modules and is electrically and directly connected to the second module-side connection section, a second unit-side connection section that is provided in a position opposite to the first module-side connection section in the other of the set of modules and is electrically and directly connected to the first module-side connection section, and a first circuit unit that electrically connects the first and second unit-side connection sections to each other.

This configuration enables the set of modules adjacent to each other to be electrically connected via the relay unit disposed across the set of modules. That is, various kinds of communication and power supplies can be relayed between the set of modules via the second module-side connection sections, the first unit-side connection section, the first circuit unit, the second unit-side connection section, and the first module-side connection sections. For this reason, connection of the modules using electric wires (wire harnesses) can be suppressed, and thus reduction of wires such as communication wires and power supply wires can be realized.

In the above configuration, it is preferable that a bridge support member that supports the modules is further provided, and the relay unit is provided in the bridge support member.

This configuration enables, after the installation of bridge support member, the module-side connection sections and the unit-side connection sections to be connected together with the installation of the modules on the bridge support member. Thus, the number of assembly steps is reduced and the linear conveyor can be assembled efficiently.

In the linear conveyor, it is preferable that the conveyance path has an end, the relay unit is further disposed at an end part on an opposite side of the end module from a connecting side, the end module being located at the end of the conveyance path, and the relay unit further includes a third unit-side connection section that is provided in a position opposite to the first module-side connection section at the end part on the opposite side of the end module from the connecting side and is electrically and directly connected to the first module-side connection section in a state where the relay unit is disposed at the end part on the opposite side of the end module from the connecting side, a fourth unit-side connection section for external connection, and a second circuit unit that electrically connects the third and fourth unit-side connection sections to each other.

This configuration enables electric input from outside to the end module via the relay unit.

In this case, for example, a power supply device that is connected to the fourth unit-side connection section of the relay unit disposed at the end part on the opposite side of the end module from the connecting side can be further provided.

This configuration enables power supply from outside to the end module via the relay unit.

In the above linear conveyor, the first circuit unit includes a switching member capable of switching the first unit-side connection section and the second unit-side connection sections between a connected state and a disconnected state, the switching member includes a power supply connection section capable of connecting a power supply device to any one of the first and second unit-side connection sections in the disconnected state, and in at least one of the plurality of relay units disposed on the connecting positions, the switching member selects the disconnected state, and the power supply device may be connected to the power supply connection section.

This configuration enables power supply to the modules in a middle portion of the conveyance path via the relay units disposed on the connecting positions of the sets of adjacent modules.

In the above linear conveyor, the conveyance path includes a first conveyance path constituted by the plurality of modules, and a second conveyance path constituted by the plurality of modules and is provided in parallel and back-to-back with respect to the first conveyance path. Connecting positions of the modules in the first conveyance path and connecting positions of the modules in the second conveyance path are set to identical positions in the direction along the conveyance path. The relay unit may include the first and second unit-side connection sections and the first circuit unit associated with the modules in the first conveyance path, and the first and second unit-side connection sections and the first circuit unit associated with the modules in the second conveyance path back-to-back.

In this case, the relay unit is disposed at the end part on the opposite side of the end module from the connecting side. The relay unit may further include the third and fourth unit-side connection sections and a second circuit unit associated with the module in the first conveyance path, and the third and fourth unit-side connection sections and a second circuit unit associated with the module in the second conveyance path back-to-back.

With these configurations, commonality of the relay units for the two conveyance paths, namely, the first conveyance path and the second conveyance path can be achieved. For this reason, in the linear conveyor having the two conveyance paths back-to-back, communication wires and power supply wires can be reduced, and the number of assembly steps for the linear conveyor can be reduced.

Meanwhile, a relay unit according to the present disclosure is a relay unit in a linear conveyor including a plurality of modules. The plurality of modules have rails and linear motor stators, respectively, and are connected in a row to constitute a conveyance path. The relay unit is disposed across a set of modules adjacent to each other in a connecting position of the set of modules. The plurality of modules are configured such that each of the plurality of modules having first and second module-side connection sections, respectively, provided on identical surfaces at both ends in a direction along the conveyance path. The plurality of modules are connected in a row in a state that the first module-side connection sections are located on one side in the direction along the conveyance path. The relay unit includes a first unit-side connection section that is provided in a position opposite to the second module-side connection section in one of the set of modules and is electrically and directly connected to the second module-side connection section, a second unit-side connection section that is provided in a position opposite to the first module-side connection section in the other of the set of modules and is electrically and directly connected to the first module-side connection section, and a first circuit unit that electrically connects the first and second unit-side connection sections to each other.

When the conveyance path has an end, it is preferable that the relay unit is further disposed at the end part on an opposite side of the end module from a connecting side, with the end module being located at the end of the conveyance path, and further includes a third unit-side connection section that is provided in a position opposite to the first module-side connection section at the end part on the opposite side of the end module from the connecting side and is electrically and directly connected to the first module-side connection section in a state where the relay unit is disposed at the end part on the opposite side of the end module from the connecting side, a fourth unit-side connection section for external connection, and a second circuit unit that electrically connects the third and fourth unit-side connection sections to each other.

Such relay units can be suitably used as a relay unit of the above-described linear motor.

In the above relay unit, it is preferable that the first and second unit-side connection sections are disposed in the direction along the conveyance path, and the third unit-side connection section is provided in a position outside the first and second unit-side connections in the disposing direction.

In this configuration, only by shifting the relay units in the direction along the conveyance path with respect to the modules, the relay units can be disposed across the set of the adjacent modules and at the end part on the opposite side of the end module from the connecting side, respectively.

What is claimed is:

1. A linear conveyor comprising:
a plurality of modules that has rails and linear motor stators, respectively, the plurality of modules including individual modules that are connected to each other in a row to constitute a conveyance path;
a slider that includes a linear motor mover and travels along the conveyance path;
a bridge support member that supports a set of modules adjacent to each other at a connecting position of the set of modules; and
a relay unit that is provided in the bridge support member and disposed across the set of modules in the connecting position,
wherein the plurality of modules are configured such that each of the plurality of modules has first and second module-side connection sections provided on identical surfaces at both ends in a direction along the conveyance path, the plurality of modules being connected in a row in a state that the first module-side connection sections are located on one side in the direction along the conveyance path, and
the relay unit includes a first unit-side connection section that is provided in a position opposite to the second module-side connection section in one of the set of modules and is electrically and directly connected to the second module-side connection section, a second unit-side connection section that is provided in a position opposite to the first module-side connection section in the other of the set of modules and is electrically and directly connected to the first module-side connection section, and a first circuit unit that electrically connects the first and second unit-side connection sections to each other.

2. The linear conveyor according to claim 1, wherein the conveyance path has an end,
the relay unit is further disposed at an end part on an opposite side of the end module from a connecting side, the end module being located at the end of the conveyance path, and
the relay unit further includes a third unit-side connection section that is provided in a position opposite to the first module-side connection section at the end part on the opposite side of the end module from the connecting side and is electrically and directly connected to the first module-side connection section in a state where the relay unit is disposed at the end part on the opposite side of the end module from the connecting side, a fourth unit-side connection section for external connection, and a second circuit unit that electrically connects the third and fourth unit-side connection sections to each other.

3. The linear conveyor according to claim 2, further comprising a power supply device connected to the fourth unit-side connection section of the relay unit disposed at the end part on the opposite side of the end module from the connecting side.

4. The linear conveyor according to claim 3, wherein the conveyance path includes a first conveyance path constituted by the plurality of modules, and a second conveyance path constituted by the plurality of modules and is provided in parallel and back-to-back with respect to the first conveyance path,
connecting positions of the modules in the first conveyance path and connecting positions of the modules in the second conveyance path are set to identical positions in the direction along the conveyance path, and
the relay unit includes the first and second unit-side connection sections and the first circuit unit associated with the modules in the first conveyance path, and the first and second unit-side connection sections and the first circuit unit associated with the modules in the second conveyance path back-to-back.

5. The linear conveyor according to claim 2, wherein the first circuit unit includes a switching member capable of switching the first unit-side connection section and the second unit-side connection section between a connected state and a disconnected state,
the switching member includes a power supply connection section capable of connecting a power supply device to any one of the first and second unit-side connection sections in the disconnected state, and
in at least one of the plurality of relay units disposed on the connecting positions, the switching member selects the disconnected state, and the power supply device is connected to the power supply connection section.

6. The linear conveyor according to claim 2, wherein the conveyance path includes a first conveyance path constituted by the plurality of modules, and a second conveyance path constituted by the plurality of modules and is provided in parallel and back-to-back with respect to the first conveyance path,
connecting positions of the modules in the first conveyance path and connecting positions of the modules in the second conveyance path are set to identical positions in the direction along the conveyance path, and
the relay unit includes the first and second unit-side connection sections and the first circuit unit associated with the modules in the first conveyance path, and the first and second unit-side connection sections and the first circuit unit associated with the modules in the second conveyance path back-to-back.

7. The linear conveyor according to claim 1, wherein the first circuit unit includes a switching member capable of switching the first unit-side connection section and the second unit-side connection section between a connected state and a disconnected state,
the switching member includes a power supply connection section capable of connecting a power supply device to any one of the first and second unit-side connection sections in the disconnected state, and
in at least one of the plurality of relay units disposed on the connecting positions, the switching member selects the disconnected state, and the power supply device is connected to the power supply connection section.

8. The linear conveyor according to claim 7, wherein the conveyance path includes a first conveyance path constituted by the plurality of modules, and a second conveyance path constituted by the plurality of modules and is provided in parallel and back-to-back with respect to the first conveyance path,
connecting positions of the modules in the first conveyance path and connecting positions of the modules in the second conveyance path are set to identical positions in the direction along the conveyance path, and
the relay unit includes the first and second unit-side connection sections and the first circuit unit associated with the modules in the first conveyance path, and the first and second unit-side connection sections and the first circuit unit associated with the modules in the second conveyance path back-to-back.

9. The linear conveyor according to claim 1, wherein the conveyance path includes a first conveyance path constituted by the plurality of modules, and a second conveyance path constituted by the plurality of modules and is provided in parallel and back-to-back with respect to the first conveyance path, connecting positions of the modules in the first conveyance path and connecting positions of the modules in the second conveyance path are set to identical positions in the direction along the conveyance path, and the relay unit includes the first and second unit-side connection sections and the first circuit unit associated with the modules in the first conveyance path, and the first and second unit-side connection sections and the first circuit unit associated with the modules in the second conveyance path back-to-back.

10. The linear conveyor according to claim 9, wherein the relay unit is disposed at the end part on the opposite side of the end module from the connecting side, and the relay unit further includes the third and fourth unit-side connection sections and a second circuit unit associated with the module in the first conveyance path, and the third and fourth unit-side connection sections and a second circuit unit associated with the module in the second conveyance path back-to-back.

11. A relay unit in a linear conveyor including a plurality of modules, the plurality of modules having rails and linear motor stators, respectively, and being connected in a row to constitute a conveyance path, and a bridge support member that supports a set of modules adjacent to each other in a connecting position of the set of modules, the relay unit being provided in the bridge support member and disposed across the set of modules, the plurality of modules are configured such that each of the plurality of modules having first and second module-side connection sections, respectively, provided on identical surfaces at both ends in a direction along the conveyance path, the plurality of modules being connected in a row in a state that the first module-side connection sections are located on one side in the direction along the conveyance path, the relay unit comprising:

a first unit-side connection section that is provided in a position opposite to the second module-side connection section in one of the set of modules and is electrically and directly connected to the second module-side connection section;

a second unit-side connection section that is provided in a position opposite to the first module-side connection section in the other of the set of modules and is electrically and directly connected to the first module-side connection section; and a first circuit unit that electrically connects the first and second unit-side connection sections to each other.

12. The relay unit according to claim 11, wherein the conveyance path has an end, and the relay unit is further disposed at an end part on an opposite side of the end module from a connecting side, the end module being located at the end of the conveyance path, the relay unit further comprising:

a third unit-side connection section that is provided in a position opposite to the first module-side connection section at the end part on the opposite side of the end module from the connecting side and is electrically and directly connected to the first module-side connection section in a state where the relay unit is disposed at the end part on the opposite side of the end module from the connecting side;

a fourth unit-side connection section for external connection; and a second circuit unit that electrically connects the third and fourth unit-side connection sections to each other.

13. The relay unit according to claim 12, wherein the first and second unit-side connection sections are disposed in the direction along the conveyance path, and the third unit-side connection section is provided in a position outside the first and second unit-side connection sections in the disposing direction.

* * * * *